United States Patent [19]

Jolly

[11] 4,181,571
[45] Jan. 1, 1980

[54] NUCLEAR REACTOR WITH FUEL PIN BRACING GRID

[75] Inventor: Robert Jolly, Preston, England

[73] Assignee: United Kingdom Atomic Energy Authority, London, England

[21] Appl. No.: 935,805

[22] Filed: Aug. 22, 1978

[30] Foreign Application Priority Data

Sep. 9, 1977 [GB] United Kingdom ............... 37772/77

[51] Int. Cl.² .......................... G21C 3/18; G21C 1/02
[52] U.S. Cl. ........................................ 176/40; 176/78; 248/68 R
[58] Field of Search ..................... 176/76, 78, 40, 87; 248/68 R

[56] References Cited

U.S. PATENT DOCUMENTS

| 3,753,855 | 8/1973 | Donck | 176/78 |
| 4,036,690 | 7/1977 | Betts et al. | 176/78 |
| 4,056,441 | 11/1977 | Marmonier et al. | 176/78 |

FOREIGN PATENT DOCUMENTS 1497083  4/1967  France ..................................... 176/76

Primary Examiner—Harvey E. Behrend
Attorney, Agent, or Firm—Larson, Taylor and Hinds

[57] ABSTRACT

A fuel pin bracing grid for a nuclear fuel sub-assembly comprises a honeycomb array of unit cells formed from discrete strips. The cells are hexagonal, three alternate sides having windows and the remaining sides have linear groups of three embossments to provide guide pads for fuel pins. The openings provide a measure of compliancy for the grid to facilitate insertion and withdrawal of the pins. A fuel sub-assembly for a liquid metal cooled fast breeder nuclear reactor has a central fuel section with end extensions, the fuel section comprising a bundle of fuel pins in a hexagonal wrapper the pins being braced by a series of grids according to the invention. Reprocessing of the fuel is facilitated because the pins are withdrawable collectively from the compliant grids and wrapper combination merely by cutting an end extension from the wrapper.

4 Claims, 5 Drawing Figures

NUCLEAR REACTOR WITH FUEL PIN BRACING GRID

BACKGROUND OF THE INVENTION

This invention relates generally to nuclear reactors but more particularly to bracing grids for nuclear reactor fuel sub-assemblies.

A nuclear reactor may have a fuel assembly comprising a plurality of fuel sub-assemblies each sub-assembly comprising a bundle of spaced fuel pins enclosed within a tubular wrapper. Where the fuel pins are closely spaced and slender as in a sub-assembly for a liquid metal cooled fast breeder nuclear reactor they may be spaced apart by a longitudinal series of bracing grids disposed at intervals along the sub-assembly to ensure that the coolant subchannels bounded by the fuel pins are maintained continuous. A typical bracing grid comprises a plurality of strips of material formed to produce a complex of hexagonally shaped cells in honeycomb pattern. Each sub-assembly may contain 250 to 350 fuel pins and the bracing grids are required to be manufactured to very close tolerances to ensure that the pins can be inserted in the longitudinal series of grids during assembly. A typical nuclear reactor of this kind with honeycomb bracing grids is disclosed in United States Pat. No. 4,036,690. Adverse tolerances in the construction of the grid can result in severe damage to the pins on insertion during assembly and on withdrawal during disassembly when the irradiated pins are fragile and it is an object of the invention to provide for a nuclear reactor a fuel sub-assembly having fuel pin bracing grids possessing a degree of compliancy whereby the fuel pins are enabled to be inserted and withdrawn collectively of the grids without causing serious damage.

SUMMARY OF THE INVENTION

According to the invention in a fuel pin bracing grid for a nuclear fuel sub-assembly and comprising a plurality of strips formed to produce a complex of hexagonally shaped unit cells in honeycomb pattern, each cell is formed from a discrete strip of material, each of three alternate sides of the cell having a window or opening formed therein and the remaining sides being continuous, each continuous side having an embossment to provide a guide pad for a fuel pin. The windows reduce the stiffness of the regions intermediate the ends of the cells thereby endowing the grid with sufficient compliancy for, according to one aspect, the pins to deflect resiliently the cells of successive grids on entry with low insertion loads and without causing serious damage by scoring of the pins, and, according to a second aspect, to enable the pins to be withdrawn by low withdrawal loads thereby minimising damage to brittle irradiated pins. The unit cell construction provides a strong grid with compliancy, it facilitates manufacture by jigs which maintain accurate the geometrical relationship of the cells and simplifies manufacture because the cells can be joined together by edge welds applied collectively from each face of the grid.

In a preferred construction of bracing grid according to the invention the continuous sides of each unit cell have a pair of second embossments, the second embossments of each pair being disposed one on each side of the first embossments to form a linear group extending parallel to the longitudinal axis of the cells, the second embossments being of lesser radial height than the first embossments. The preferred construction of bracing grid has two levels of compliancy, firstly the compliancy of the intermediate regions of the cells as afforded by the windows and secondly the lesser compliancy afforded by the stiffer end regions of the cells wherein all the sides of the end regions are uninterrupted. The second embossments can provide additional supports for the fuel pins to resist bowing during irradiation and thereby facilitate withdrawal of the bundle of fuel pins from the wrapper and grid.

The invention will reside in a nuclear fuel sub-assembly comprising a central fuel section extended at opposite ends by a locating section and a neutron shielding section and wherein the central fuel section comprises a multiplicity of elongate fuel pins spaced apart within a tubular wrapper by a series of bracing grids, each grid comprising a plurality of strips formed to produce a complex of hexagonally shaped unit cells in honeycomb pattern, each cell being formed from a discrete strip of material, each of three alternate sides of the cell having a window or opening formed therein and the remaining sides being continuous, each continuous side having an embossment to provide a guide pad for a fuel pin. A fuel sub-assembly embodying the invention has the advantage that it can be readily dismantled by cutting the wrapper to separate the end sections from the fuel section and withdrawing the fuel pins collectively from the wrapper and grid combination thereby greatly facilitating reprocessing.

The invention will also reside in a liquid metal cooled fast breeder nuclear reactor of the kind wherein a nuclear fuel assembly is submerged in a pool of coolant, the fuel assembly comprising a plurality of fuel sub-assemblies upstanding in side-by-side array, each sub-assembly comprising a multiplicity of elongate fuel pins spaced apart within a tubular wrapper by a series of bracing grids each grid comprising a plurality of strips formed to produce a complex of hexagonally shaped unit cells in honeycomb pattern, each cell being formed from a discrete strip of material, each of three alternate sides of the cell having a window or opening formed therein and the remaining sides being continuous, each continuous side having a first embossment to provide a guide pad for a fuel pin and a pair of second embossments disposed one on each side of the first embossment to form a linear group extending parallel to the longitudinal axis of the cells, the second embossments being of lesser radial height than the first embossments. A liquid metal cooled fast breeder nuclear reactor of the pool kind has a fuel assembly comprising a multiplicity of slender fuel pins which are susceptible to severe bowing under irradiation; the second embossments of the bracing grids provide additional lateral support for the pins to restrain that bowing whenever the supports provided by the first embossments are inadequate because of the compliant nature of the grid.

DESCRIPTION OF THE DRAWINGS

Constructions of compliant bracing grid, fuel sub-assembly and liquid metal cooled fast breeder nuclear reactor, all embodying the invention are described, by way of example, with reference to the accompanying drawings, wherein.

DESCRIPTION OF THE PREFERRED EMBODIMENT

Figure 1:
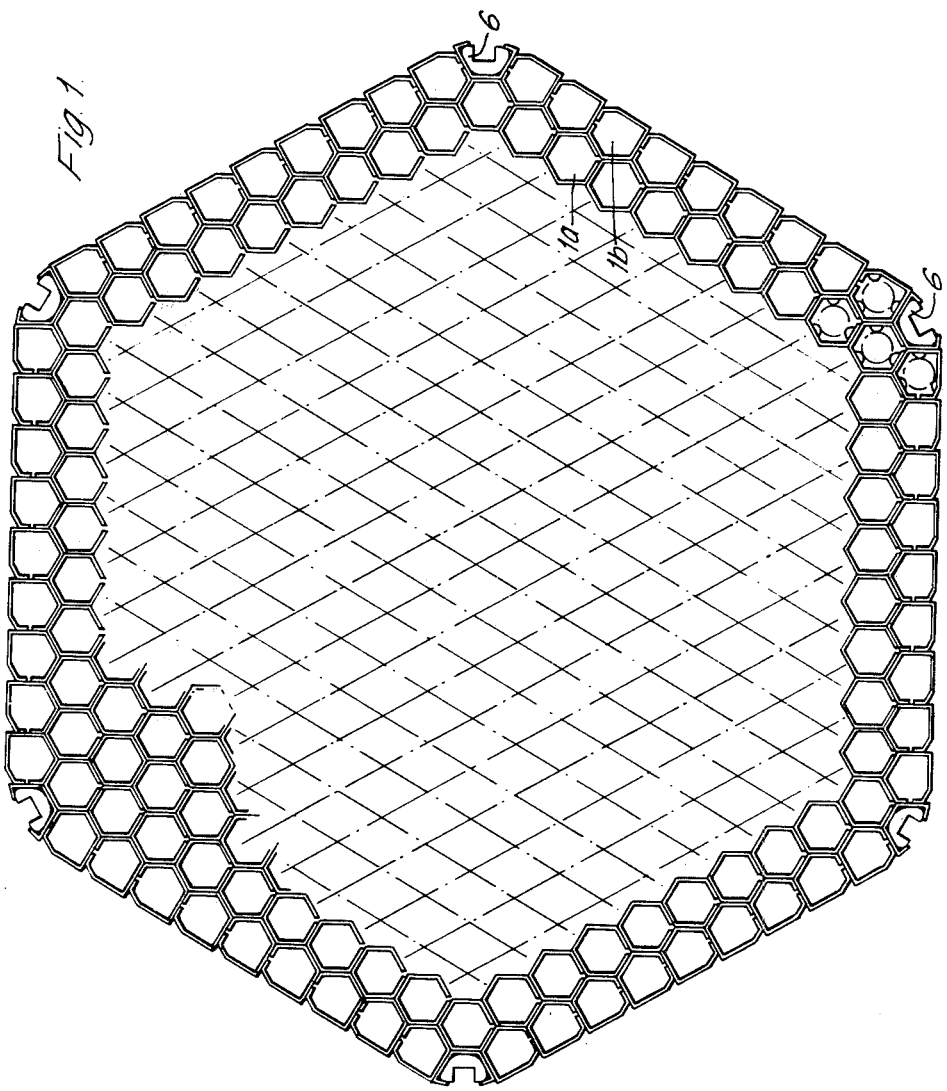
FIG. 1 is a plan view of the bracing grid.
Figure 2:
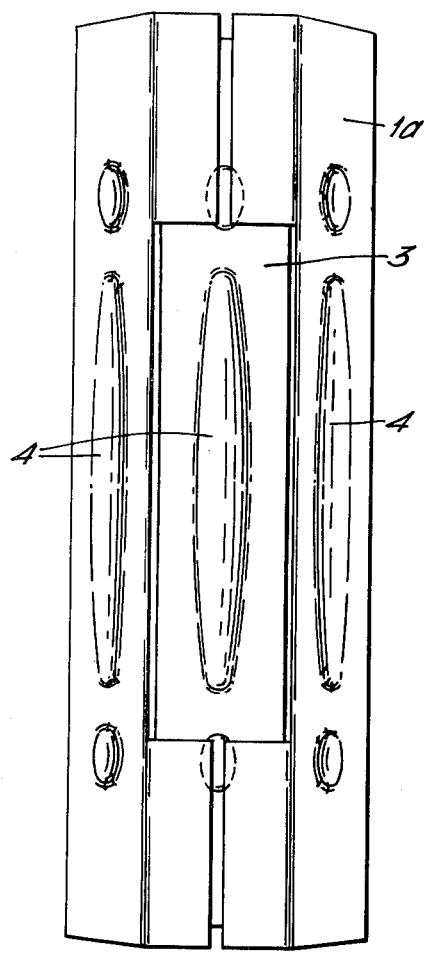
FIG. 2 is an isometric view of a unit cell of the grid shown in FIG. 1.
Figure 3:
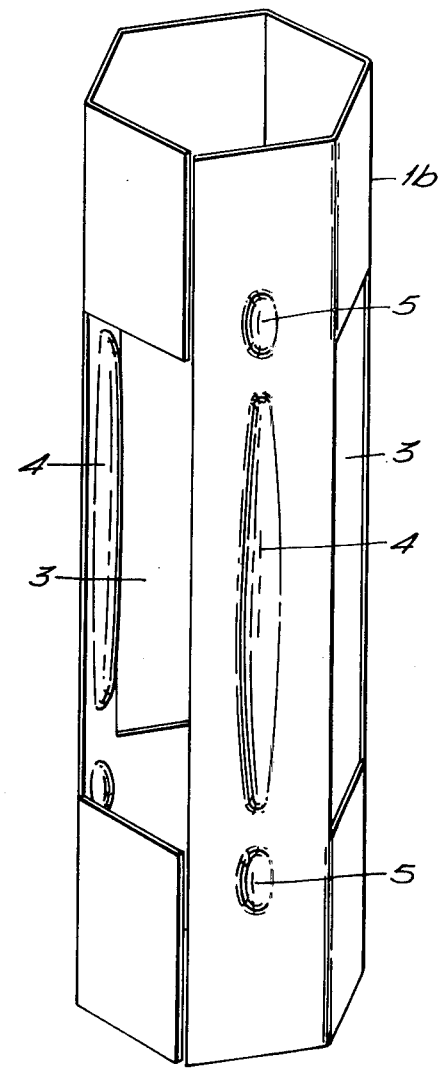
FIG. 3 is an isometric view of a second unit cell for the bracing grid shown in FIG. 1.
Figure 4:
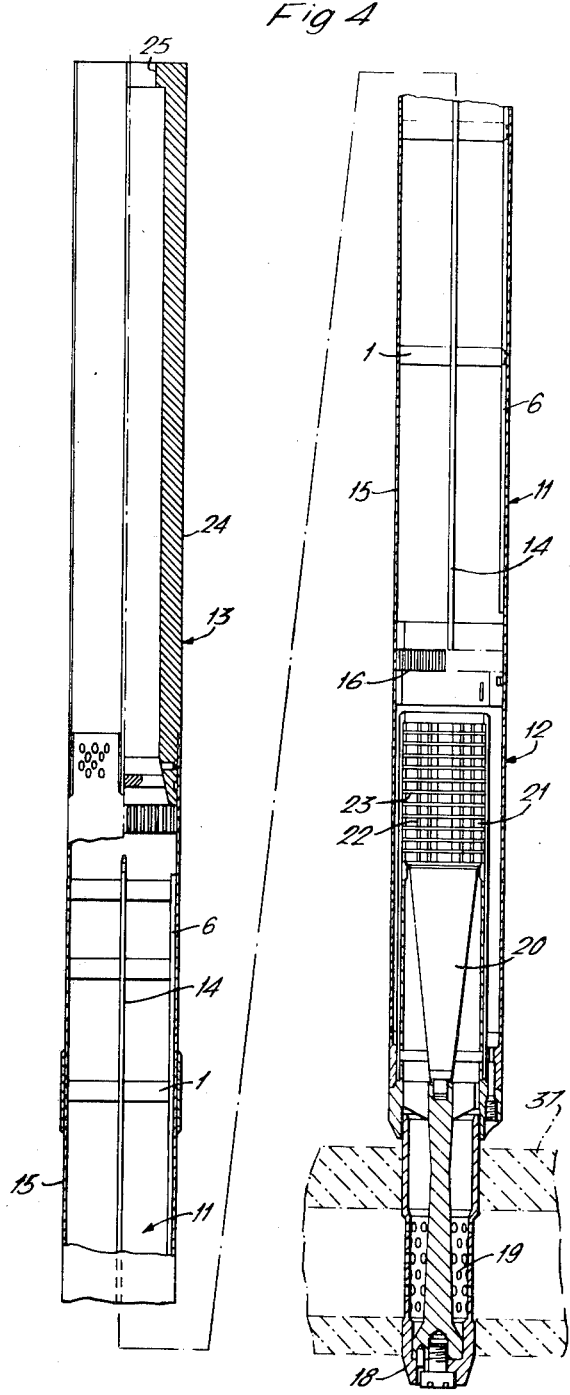
FIG. 4 is a fragmentary side view partly in section of a typical fuel sub-assembly of hexagonal cross-section, the section on the left hand side being an across flats view whilst the section on the right hand side is an across corners view.

The bracing grid shown in FIG. 1 has a right hexagonal boundary and comprises 325 unit cells 1 arranged in honeycomb pattern. The cells are of generally hexagonal shape all except the outer row of cells being right hexagonal. The cell at each corner of the complex is adapted to receive a corner post 6 of a sub-assembly to be described hereinafter. Each unit cell 1 is formed from strip material the edge-to-edge ends being spaced apart. In the outer row of the unit cells designated 1b in FIG. 1 the edge-to-edge ends of the strips occur in the middle of one side as shown in FIG. 2 whilst the inner unit cells designated 1a in FIG. 1 have the edge-to-edge ends at a corner of the hexagonal cell as shown in FIG. 3. Three alternate sides of each cell have a rectangular window 3 whilst the remaining sides each have an elongate embossment or dimple forming a guide pad for a fuel pin. In an alternative construction the windows in the outermost sides of the outermost cells are omitted. There is a pair of smaller embossments 5 disposed one beyond each end of each of the elongate embossments to form linear groups extending parallel to the longitudinal axis of the cells. The smaller embossments provide additional bracing pads or backstops for a fuel pin in the event that bowing of the pin occurs during irradiation of the fuel sub-assembly. Each pair of abutting sides of the cells are secured together by a pair of spot welds disposed in opposed end regions of the sides. The grid has across flats dimension 134.6 mm the cells 1 being formed from stainless steel strip 25.5 mm wide by 0.20 mm thick with windows 12.5 mm long and extending laterally acorss the full width of the side. The embossments 4 define a cell diameter nominally of 5.8 mm whilst the cell diameter bounded by the embossments or pads 5 is 6.1 mm.

The fuel sub-assembly shown in FIG. 3 comprises a central fuel section 11, a lower end locating section 12 and an upper end neutron shielding section 13. The fuel section 11 comprises a bundle of spaced elongate fuel pins 14 enclosed within a tubular wrapper 15. The pins are supported at their lower ends by a grid 16 and are braced intermediate their lengths by cellular grids 1 of honeycomb form. The grids 1 are disposed at intervals along the wrapper being secured thereto by engagement of the corner cells with notched posts 6 (FIG. 1) secured in the corners of the wrapper. The lower end locating section comprises a spike 18 for engaging a socket in a fuel assembly support structure 37 and has apertures 19 through which coolant can flow from within the diagrid. A conical mesh filter 20 and gag means 21 are provided for the coolant between the spike 18 and the bundle of fuel pins 14. The gag means 21 comprises a plurality of apertured plates 22 spaced apart by woven wire mesh discs 23. The upper section 13 is of massive steel and comprises a massive steel tubular member 24 which has an internal lip 25 for engagement by lifting means.

On assembly the bundle of fuel pins is threaded through successive grids 17 the grids being sufficiently compliant to enable the pins to deflect the unit cell structures to allow the pins to penetrate successive unit cells without causing scoring of the pins. After irradiation the fuel sub-assembly may be readily dismantled for reprocessing by withdrawing the bundle of fuel pins from the bracing grids and wrapper 15 combination thereby reducing the contaminated waste to be processed. The process of withdrawal of the pins is facilitated because of the compliancy of the grid and the reduced bowing of the fuel pins. By constructing the grids of unit cells manufacture is facilitated because the strips can be preformed by a jig to provide a multiplicity of identical cells which can then be assembled in honeycomb array on a second jig to maintain the cells in accurate geometrical relationship and they can be finally joined together by edge welds applied easily from each face of the grid.

Figure 5:
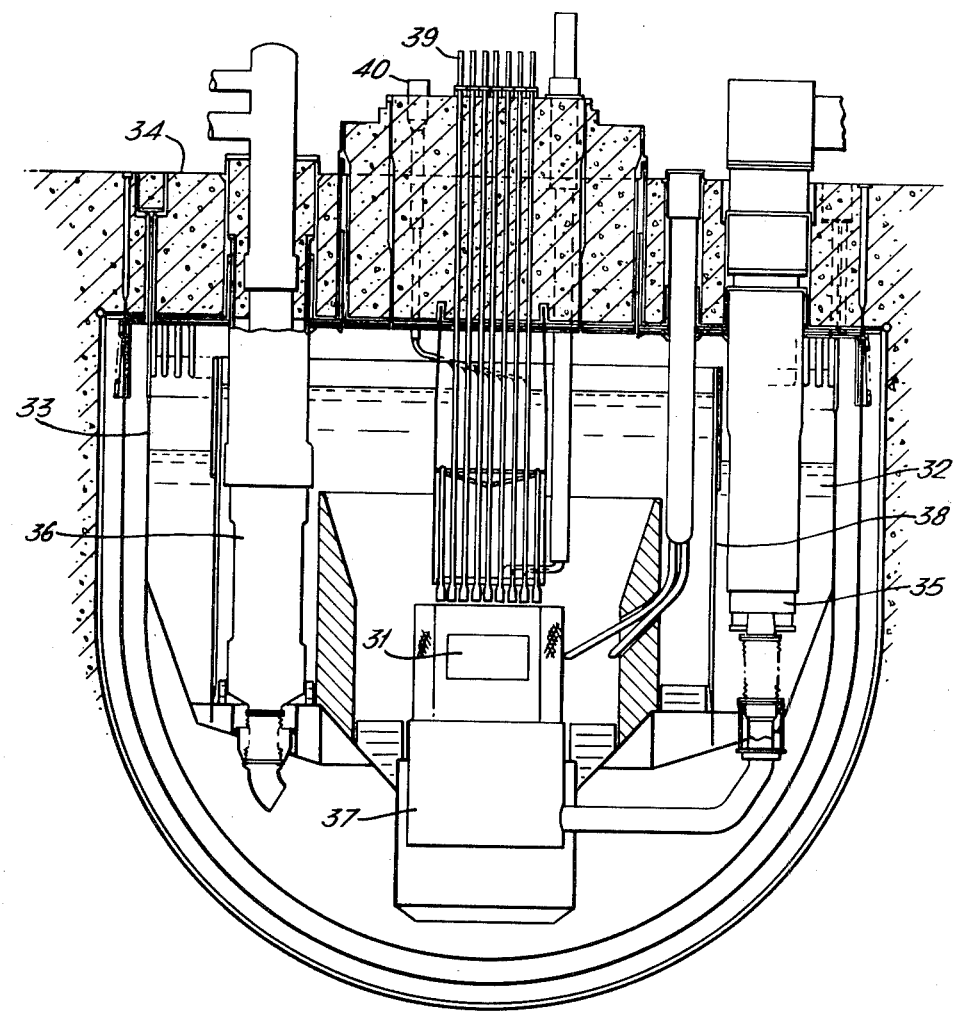
FIG. 5 is a sectional view of a typical liquid metal cooled fast breeder nuclear reactor.

A plurality of sub-assemblies is used to form a fuel assembly 31 shown in the reactor construction of FIG. 5. The fuel assembly 31 forming the reactor core is submerged in a pool 32 of liquid sodium coolant in a primary vessel 33. The primary vessel is suspended from the roof of a containment vault 34 and there is provided a plurality of coolant pumps 35 and heat exchangers 36 only one each of the pumps and heat exchangers being shown. The fuel assembly 31 mounted on a structure 37 is housed with the heat exchangers in a core tank 38 whilst the pumps 35, which deliver coolant to the diagrid, are disposed outside of the core tank. The core or fuel assembly 31 comprises a plurality of the described fuel sub-assemblies which upstand from the diagrid 37 in closely spaced side-by-side array. Control rods 39 and instrumentation 40 penetrate the roof of the vault of the core tank.

In operation of the nuclear reactor coolant is flowed from the pump 35 to the fuel assembly by way of the diagrid 37 which distributes the coolant flow throughout the fuel assembly. Flow is upwardly through the fuel sub-assemblies by way of the tubular wrappers 25 and in heat exchange with the fuel pins. Flow is thence from the upper region of the core tank 38 back to the outer region of the pool by way of the heat exchangers 36.

I claim:

1. A fuel pin bracing grid for a nuclear fuel sub-assembly, the grid comprising a plurality of strips formed to produce a complex of hexagonally shaped unit cells in honeycomb pattern, each cell being formed from a discrete strip of material, each of three alternate sides of the cell having an opening formed therein and the remaining sides being continuous, each continuous side having an embossment to provide a guide pad for a fuel pin.

2. A fuel pin bracing grid according to claim 1 wherein the continuous sides of each unit cell have a pair of second embossments, the second embossments of each pair being disposed one on each side of the first embossment to form a linear group extending parallel to the longitudinal axis of the cells, the second embossments being of lesser radial height than the first embossments.

3. A nuclear fuel sub-assembly comprising a central fuel section extended at opposite ends by a locating section and a neutron shielding section, and wherein the central fuel section comprises a multiplicity of elongate fuel pins spaced apart within a tubular wrapper by a series of bracing grids, each grid comprising a plurality of strips formed to produce a complex of hexagonally shaped unit cells in honeycomb pattern, each cell being formed from a discrete strip of material, each of three alternate sides of the cell having an opening formed therein and the remaining sides being continuous, each continuous side having an embossment to provide a guide pad for a fuel pin.

4. A liquid metal cooled fast breeder nuclear reactor of the kind wherein a nuclear fuel assembly is submerged in a pool of coolant, the fuel assembly comprising a plurality of fuel sub-assemblies upstanding in side-by-side array, each sub-assembly comprising a multiplicity of elongate fuel pins spaced apart within a tubular wrapper by a series of bracing grids, each grid comprising a plurality of strips formed to produce a complex of hexagonally shaped unit cells in honeycomb pattern, each cell being formed from a discrete strip of material, each of three alternate sides of the cell having an opening formed therein and the remaining sides being continuous, each continuous side having a first embossment to provide a guide pad for a fuel pin and a pair of second embossments disposed one on each side of the first embossment to form a linear group extending parallel to the longitudinal axis of the cells, the second embossment being of lesser radial height than the first embossments.

* * * * *